United States Patent
Simopoulos et al.

(10) Patent No.: US 9,369,001 B2
(45) Date of Patent: Jun. 14, 2016

(54) MAGNETIC FIELD DETECTION APPARATUS FOR A WIRELESS POWER TRANSFER SYSTEM

(71) Applicant: DELPHI TECHNOLOGIES, INC., Troy, MI (US)

(72) Inventors: George N. Simopoulos, Noblesville, IN (US); Jeffrey A. Ely, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 476 days.

(21) Appl. No.: 13/895,413

(22) Filed: May 16, 2013

(65) Prior Publication Data

US 2014/0339923 A1 Nov. 20, 2014

(51) Int. Cl.
*H01F 27/42* (2006.01)
*H02J 7/02* (2016.01)
*H02J 5/00* (2016.01)
*B60L 11/18* (2006.01)

(52) U.S. Cl.
CPC ............... *H02J 7/025* (2013.01); *B60L 11/182* (2013.01); *B60L 11/1824* (2013.01); *B60L 11/1861* (2013.01); *B60L 11/1864* (2013.01); *H02J 5/005* (2013.01); *B60L 2210/30* (2013.01); *B60L 2230/16* (2013.01); *Y02T 10/7005* (2013.01); *Y02T 10/7044* (2013.01); *Y02T 10/7061* (2013.01); *Y02T 10/7088* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01)

(58) Field of Classification Search
CPC .................. H02J 7/025; H02J 5/005
USPC ......................................................... 307/104
See application file for complete search history.

(56) References Cited

U.S. PATENT DOCUMENTS

| | | |
|---|---|---|
| 2005/0043761 A1 | 2/2005 | Connelly et al. |
| 2008/0211455 A1 | 9/2008 | Park et al. |
| 2011/0127954 A1* | 6/2011 | Walley ............... H01M 2/0267 320/108 |
| 2011/0221388 A1 | 9/2011 | Low et al. |
| 2011/0238135 A1 | 9/2011 | Marnfeldt et al. |
| 2011/0304216 A1 | 12/2011 | Baarman |

(Continued)

FOREIGN PATENT DOCUMENTS

WO 2012168777 A2 12/2012

OTHER PUBLICATIONS

Search Report for International Application No. PCT/US2014/036022, Aug. 22, 2014.

*Primary Examiner* — Jared Fureman
*Assistant Examiner* — Duc M Pham
(74) *Attorney, Agent, or Firm* — Robert J. Meyers

(57) ABSTRACT

A wireless power receiver configured to control an electrical connection between a capture resonator of a wireless power transfer system and an electrical load, such as a battery pack or electric motor. The circuitry of the wireless power receiver is powered directly by the power output from the capture resonator, automatically powering up the wireless power receiver as soon as the capture resonator begins producing power. The wireless power receiver 16 does not require standby power provided by an external source, such as a vehicle battery. Since the wireless power receiver does not require power from an external source, it can initiate charging of a vehicle battery even if the state of charge of the battery in the vehicle is too low to operate the controller.

5 Claims, 2 Drawing Sheets

(56) References Cited

U.S. PATENT DOCUMENTS

| | | |
|---|---|---|
| 2012/0095617 A1 | 4/2012 | Martin |
| 2012/0146576 A1* | 6/2012 | Partovi .................. H01F 7/0252 320/108 |
| 2012/0242283 A1 | 9/2012 | Kim et al. |
| 2012/0244822 A1 | 9/2012 | Kim et al. |
| 2012/0262002 A1 | 10/2012 | Widmer et al. |
| 2012/0306286 A1 | 12/2012 | Kim et al. |
| 2013/0082648 A1 | 4/2013 | Kamata |
| 2014/0152116 A1* | 6/2014 | Kim ........................ H01F 38/14 307/104 |
| 2014/0191568 A1* | 7/2014 | Partovi .................... H02J 7/025 307/9.1 |
| 2015/0295659 A1* | 10/2015 | Nogami .................... H03F 3/08 398/212 |

\* cited by examiner

MAGNETIC FIELD DETECTION APPARATUS FOR A WIRELESS POWER TRANSFER SYSTEM

TECHNICAL FIELD OF INVENTION

The invention generally relates to a wireless power transfer system, and more particularly relates to an apparatus to detect a magnetic field and activate a wireless power receiver.

BACKGROUND OF THE INVENTION

Power transfer between a source resonator and a capture resonator of a wireless power transfer system is usually initiated after a wireless communication link is established between a transmitter controller off-board the vehicle and a receiver controller on-board the vehicle. The power transfer between the power source and the load must be controlled so that the power source supplies no more energy than the load is capable of using. The receiver controller communicates with the transmitter controller to negotiate an energy transfer rate that can be accepted by the load.

It may be desirable to initiate the power transfer at some time after the vehicle has been parked near the source resonator, for instance to take advantage of off-peak electrical energy prices. In order to do this, the receiver controller must be capable of establishing communication with the transmitter controller. Therefore, the receiver controller must be maintained in a powered state or in a low power stand-by state that can respond to the transmitter controller. In either of these examples, the receiver controller requires power to be supplied from the vehicle batteries.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a wireless power receiver that is configured to receive an alternating magnetic field produced by a wireless power transmitter is provided. The wireless power receiver includes a capture resonator that is configured to produce an alternating electrical current when excited by the alternating magnetic field. The wireless power receiver also includes a current conversion circuit that is electrically coupled to the capture resonator and is configured to produce a direct electrical current when excited by the alternating electrical current produced by the capture resonator. The wireless power receiver further includes an apparatus configured to control an electrical connection between the capture resonator and the electrical load.

The wireless power receiver may also include a first transceiver in communication with the controller that is configured to communicate with a second transceiver of said wireless power transmitter. The apparatus may also include a memory device in communication with said controller that contains instructions that, when executed, cause the apparatus to establish a first communication link between the wireless power receiver and the wireless power transmitter via the first transceiver.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Presented herein is an apparatus that may be configured for use with a wireless power transfer system. The wireless power transfer system includes a wireless power transmitter and a wireless power receiver. The wireless power transfer system transmits power between the transmitter and receiver by generating an alternating magnetic field via a source resonator and receiving the alternating magnetic field via a capture resonator. The apparatus is configured to provide power to a controller of a wireless power receiver when the alternating magnetic field, hereafter referred to as a magnetic signal is supplied to the capture resonator. The controller of the wireless power system can be activated without the need to provide back-up power to the controller. A user of the wireless power transfer system could then initiate charging of a vehicle using the system by activating the wireless power transmitter even if the wireless power receiver is in a low power or no power stand-by mode.

Figure 1:
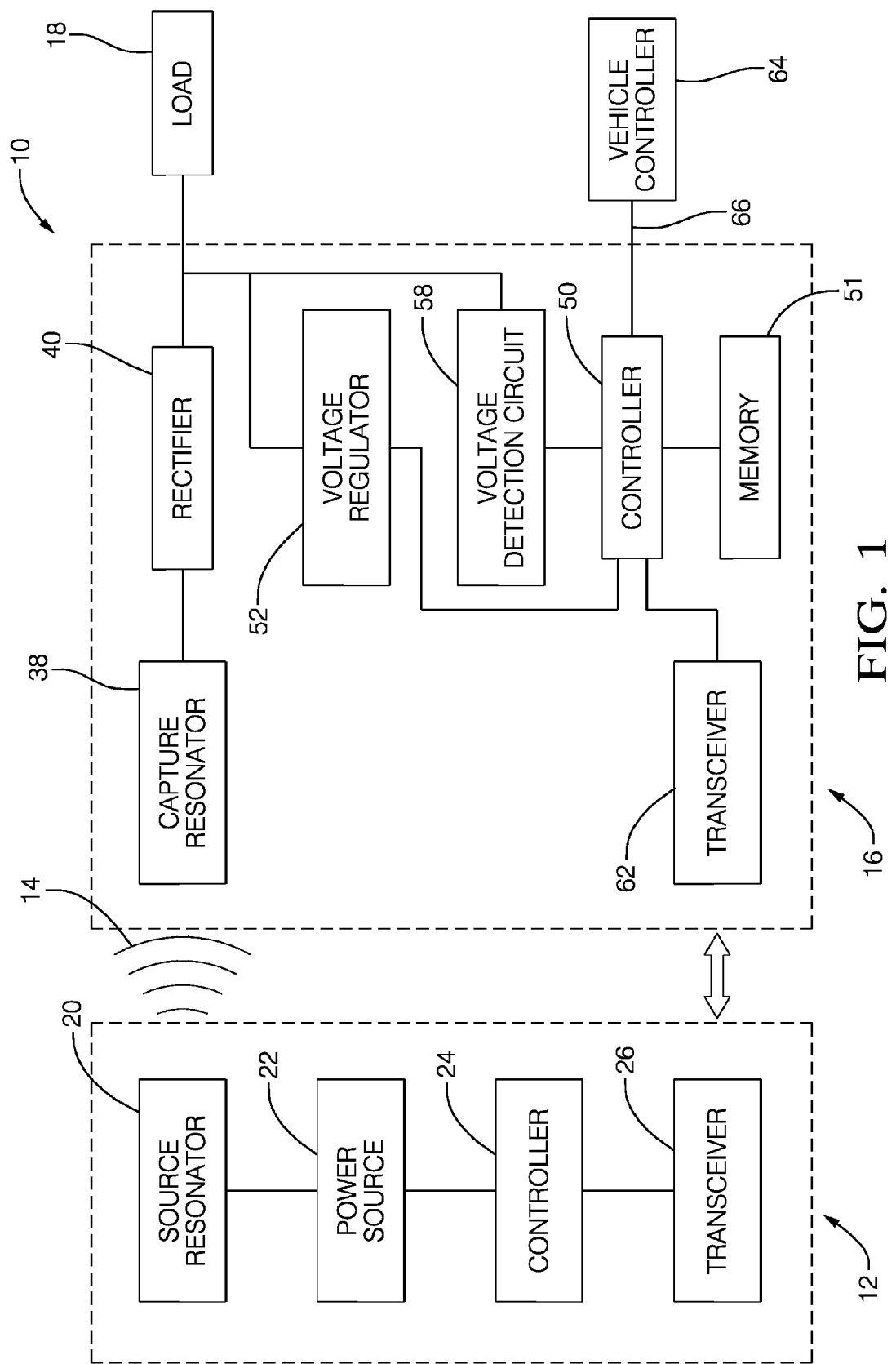
FIG. 1 is a schematic diagram of a wireless power transfer system in accordance with one embodiment.

FIG. 1 illustrates a non-limiting example of a wireless power transfer system 10. The wireless power transfer system 10 includes a wireless power transmitter 12 that is configured to generate an alternating magnetic field 14, hereafter referred to as a magnetic signal 14. The wireless power transfer system 10 further includes a wireless power receiver 16 that is configured to receive the magnetic signal 14 and convert the energy in the magnetic signal 14 to electrical energy that is supplied to an electrical load 18, in this example a battery pack of an electric vehicle.

The wireless power transmitter 12 includes a source resonator 20 that is a resonant circuit configured to generate the magnetic signal 14 when excited by an alternating current (AC) voltage supplied by a power supply 22. The power supply 22 is configured to convert electrical power (e.g. 240 volts AC at 60 hertz) from the public supply grid (not shown) to a different voltage and frequency that is supplied to the source resonator 20. The wireless power transmitter 12 also includes a transmitter controller 24 that is configured to control the power supply 22 and thereby control the magnetic signal 14 provided by the source resonator 20. The wireless power transmitter 12 further includes a first transceiver 26 that is in communication with the transmitter controller 24 and is configured to establish a wireless communication link 28 with the wireless power receiver 16.

Figure 2:
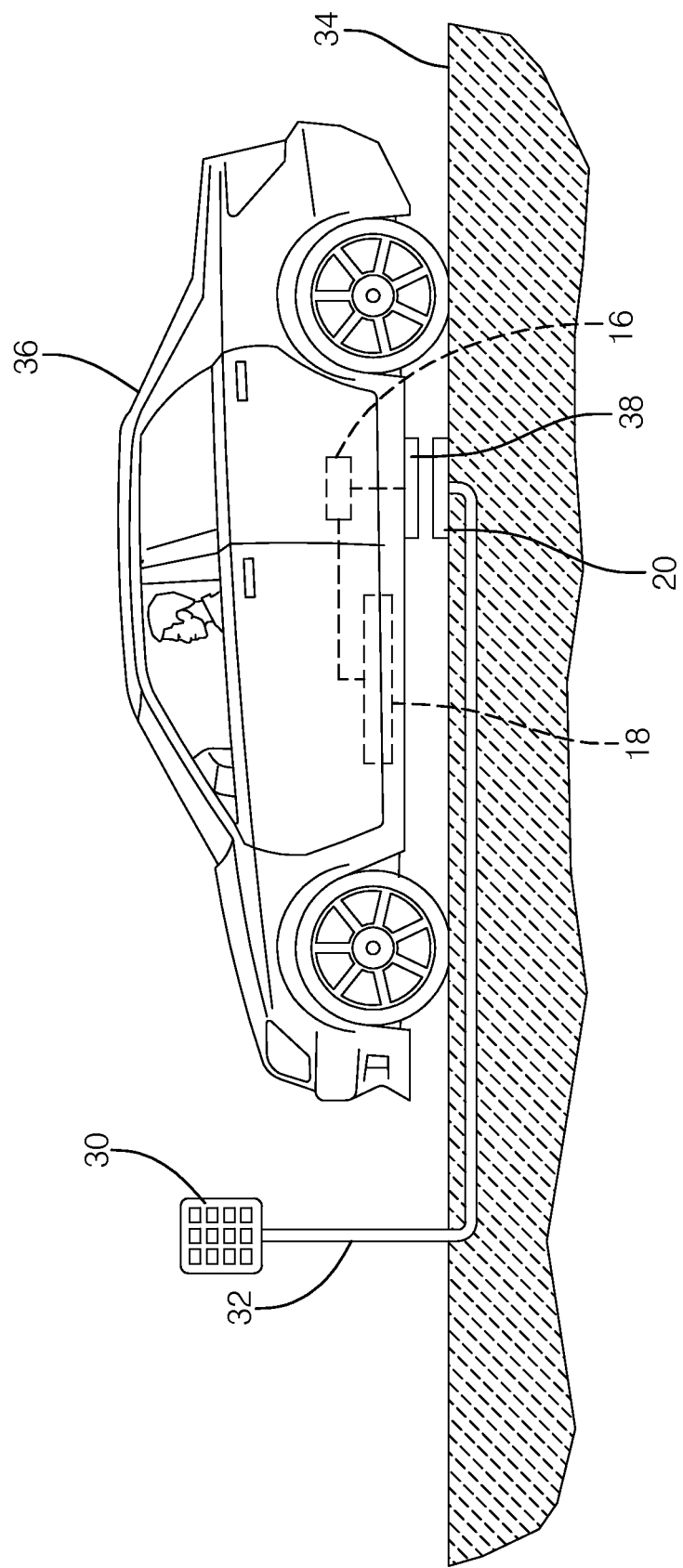
FIG. 2 is a side view of a vehicle incorporating a wireless power transfer system in accordance with one embodiment.

According to a non-limiting example illustrated in FIG. 2, the power supply 22, the transmitter controller 24, and the first transceiver 26 may be contained in a stand-alone housing 30 that is located remotely from the source resonator 20. In this example, the housing 30 is mounted on a pylon 32 or post in front of a vehicle parking space while the source resonator 20 is located on or in the parking surface 34 under a vehicle 36. Other embodiments may be envisioned in which the source resonator 20 is co-located with the power supply 22, the transmitter controller 24, and the first transceiver 26 in the parking surface 34.

Referring again to FIG. 1, the wireless power receiver 16 includes a capture resonator 38 that is a resonant circuit configured to generate an alternating electrical current when excited by the magnetic signal 14 generated by the source resonator 20. The wireless power receiver 16 also includes a rectifier circuit 40 that converts (rectifies) the alternating current (AC) electrical power provided by the capture resonator 38 to direct current (DC) electrical power that is usable by an electrical load 18 such as an electric vehicle (EV) or hybrid electric vehicle (HEV) battery pack. Alternative embodiments may be envisioned that provide the AC power output from the capture resonator unchanged to AC electrical load, such as an AC motor that includes circuitry to alter the frequency and voltage of the AC power provided to the AC load. The wireless power receiver 16 also includes a voltage regulator circuit 52 that is connected to the output of the rectifier circuit 40 and a controller 50 and is configured to provide electrical power to the controller 50.

The voltage regulator circuit 52 that has an input that is electrically coupled to the capture resonator 38 via the rectifier circuit 40 and has an output that is electrically coupled to the controller 50. The voltage regulator circuit 52 provides electrical power to the controller 50 whenever the capture resonator 38 is providing electrical power. The voltage regulator circuit 52 is configured to supply electrical power to the controller 50 at the voltage required for proper operation of the controller 50 rather than the high voltage output by the rectifier circuit 40. The controller 50 is configured to "wake-up" and beginning operating when the voltage regulator circuit 52 begins providing power to the controller 50. The voltage regulator circuit 52 may include several circuits such a 12 volt regulator to regulate the high voltage output from the rectifier circuit 40 to a voltage that can be used by the other circuits of the apparatus that require a 12 volt power and a 5 volt regulator that receives 12 volt power from the 12 volt regulator and supplies regulated 5 volt power to the controller 50 and other circuitry requiring a 5 volt power supply.

The controller 50 may include a microprocessor or application specific integrated circuit (ASIC). Software instructions that program the controller 50 to control the wireless power receiver 16 are stored in a non-volatile (NV) memory device 51. The memory device 51 may be contained within the microprocessor or ASIC or it may be a separate device. Non-limiting examples of the types of NV memory that may be used include electrically erasable programmable read only memory (EEPROM), masked read only memory (ROM) and flash memory. The controller 50 may also include analog to digital (A/D) convertor circuits and digital to analog (D/A) convertor circuits to allow the convertor to establish electrical communication with devices outside the controller 50. The controller 50 described herein may include several microprocessors that are communicating with each other.

The wireless power receiver 16 may also include a voltage detection circuit 58 that is also connected to the output of the capture resonator 38 the controller 50 and may be used as an input by the controller 50 to determine whether the capture resonator 38 is outputting electrical power.

The wireless power receiver 16 additionally includes a voltage detection circuit 58 that is electrically coupled to the capture resonator 38, in this example directly electrically connected to the output of the rectifier circuit 40. The voltage detection circuit 58 senses when there is high voltage DC on the output of the rectifier circuit 40 and sends a digital signal to the controller 50.

Typically in high voltage circuits, voltage regulators and other circuits that are attached to the high voltage should be isolated for safety reasons. In the case of the voltage detection circuit 58, an optocoupler is used. The voltage regulator circuit 52 may include isolation transformers; however other high voltage (HV) isolation methods may alternatively be employed.

The wireless power receiver 16 also includes a second transceiver 62 that is configured to establish the wireless communication link 28 between the wireless power receiver 16 and the wireless power transmitter 12 via the first transceiver 26. The second transceiver 62 is in communication with the controller 50. The second transceiver 62 is electrically coupled to and powered by the voltage regulator circuit 52. Alternatively, it may be powered by a separate power supply, such as a vehicle electrical system powered by the battery.

Typically, the controller 50 would be in a sleep or inactive state to minimize power consumption when not in operation. However, if power is already flowing between the wireless power transmitter 12 and the wireless power receiver 16, it needs to be managed quickly. The voltage regulator circuit 52 is connected to the high voltage output of the rectifier circuit 40. The voltage regulator circuit 52 provides power to the controller 50 and the rest of the circuits in the wireless power receiver 16 as soon as the rectifier circuit 40 begins providing high voltage power. The controller 50 is activated by power supplied from the voltage regulator circuit 52 and then goes through an internal wake-up procedure and examines all inputs of the controller 50. One of these inputs may be a logic level signal from the voltage detection circuit 58, which the controller 50 may use, along with other inputs, to determine whether or not it had activated by an ignition switch, other wake-up signals, or power supplies that the controller 50 is monitoring. The controller 50 may also communicate with the vehicle controller 64 via a data communication bus 66 such as a Controller Area Network (CAN) bus 66 or other data communications method in order to determine how the power should be used.

When the controller 50 and the transmitter controller 24 are communicating via the wireless communication link 28, the controller 50 authorizes the wireless power transmitter 12 to provide a charging power to the wireless power receiver 16. The wireless power receiver 16 then regulates the power transmitted by the wireless power transmitter 12.

The system 10 may automatically initiate power transfer from the wireless power transmitter 12 rather than from the wireless power receiver 16. The wireless power receiver 16 can detect and use a wide variety of magnetic field sources automatically to wake up and begin regulating power from the wireless power transmitter 12.

Accordingly, a wireless power receiver 16 for controlling an electrical connection between a capture resonator 38 of a wireless power transfer system 10 and an electrical load 18 is provided. The circuitry of the wireless power receiver 16 is powered directly by the power output from the capture resonator 38. This provides the benefit of automatically powering up the wireless power receiver 16 as soon as the capture resonator 38 begins producing power. The wireless power receiver 16 does not require stand-by power provided by an external source, such as a vehicle battery 18. Since the wireless power receiver 16 does not require power from an external source, the wireless power receiver 16 also provides the benefit of being able to initiate charging of a vehicle battery 18 even if the state of charge of the battery in the vehicle 36 is too low to operate the controller 50, i.e. "dead battery".

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A wireless power receiver configured to receive an alternating magnetic field produced by a wireless power transmitter, said wireless power receiver comprising:
   a capture resonator configured to produce an alternating electrical current when excited by the alternating magnetic field;
   a rectifier circuit electrically coupled to said capture resonator and configured to produce a direct electrical current when excited by said alternating electrical current;
   a controller configured to control the wireless power receiver;
   a voltage regulator circuit electrically coupled to the capture resonator and the controller, wherein the controller is configured to receive electrical power from the voltage regulator circuit when the capture resonator is receiving the alternating magnetic field, thereby activating the controller; and
   a voltage detection circuit electrically coupled to the rectifier circuit and in communication with the controller and configured to determine the voltage of the direct electrical current, wherein the voltage detection circuit is directly electrically connected to an output of the rectifier circuit and configured to sense when there is high voltage direct electrical current on the output of the rectifier circuit and send a digital signal to the controller.

2. The wireless power receiver according to claim 1, further comprising a first transceiver configured to communicate with a second transceiver of said wireless power transmitter, wherein the controller is in communication with said first transceiver.

3. The wireless power receiver according to claim 2, further comprising a memory device in communication with said controller containing instructions that, when executed, cause the wireless power receiver to establish a first communication link between the wireless power receiver and the wireless power transmitter via the first transceiver.

4. The wireless power receiver according to claim 3, wherein the memory device further contains instructions that, when executed, cause the controller to determine whether the capture resonator is outputting electrical power.

5. The wireless power receiver according to claim 3, wherein the memory device further contains instructions that, when executed, cause the controller to determine whether the controller was activated by electrical power from the voltage regulator circuit based on the digital signal.

* * * * *